United States Patent
Chou et al.

(10) Patent No.: US 12,437,635 B2
(45) Date of Patent: Oct. 7, 2025

(54) REAL-TIME TRAFFIC CONDITION WARNING SYSTEM

(71) Applicant: Nissan North America, Inc., Franklin, TN (US)

(72) Inventors: Fang-Chieh Chou, Sunnyvale, CA (US); Liam Pedersen, San Francisco, CA (US); Najamuddin Mirza Baig, San Jose, CA (US)

(73) Assignee: Nissan North America, Inc., Franklin, TN (US)

( * ) Notice: Subject to any disclaimer, the term of this patent is extended or adjusted under 35 U.S.C. 154(b) by 140 days.

(21) Appl. No.: 18/385,850

(22) Filed: Oct. 31, 2023

(65) Prior Publication Data
US 2025/0140115 A1 May 1, 2025

(51) Int. Cl.
| | | |
|---|---|---|
| *G08G 1/0967* | (2006.01) | |
| *B60W 30/085* | (2012.01) | |
| *B60W 30/095* | (2012.01) | |
| *B60W 50/14* | (2020.01) | |
| *B60W 60/00* | (2020.01) | |
| *G08G 1/01* | (2006.01) | |

(52) U.S. Cl.
CPC ..... *G08G 1/096725* (2013.01); *B60W 30/085* (2013.01); *B60W 30/0956* (2013.01); *B60W 50/14* (2013.01); *B60W 60/0015* (2020.02); *G08G 1/0125* (2013.01); *B60W 2050/146* (2013.01); *B60W 2554/80* (2020.02)

(58) Field of Classification Search
CPC .......... G08G 1/096725; G08G 1/0125; G08G 1/163; B60W 30/085; B60W 30/0956; B60W 50/14; B60W 60/0015; B60W 2050/146; B60W 2554/80
See application file for complete search history.

(56) References Cited

U.S. PATENT DOCUMENTS

| | | | | |
|---|---|---|---|---|
| 2017/0336788 A1* | 11/2017 | Iagnemma | ........... | G05D 1/0246 |
| 2020/0130682 A1* | 4/2020 | Buerkle | ............ | B60W 30/0956 |
| 2020/0326203 A1* | 10/2020 | Lund | ........................ | G08G 1/04 |
| 2022/0198937 A1* | 6/2022 | Meriçli | ..................... | G05D 1/69 |
| 2023/0195122 A1* | 6/2023 | Shenfeld | .............. | G06V 20/588 |
| | | | | 701/26 |

* cited by examiner

*Primary Examiner* — Jason Holloway
(74) *Attorney, Agent, or Firm* — Young Basile Hanlon & MacFarlane, P.C.

(57) ABSTRACT

A system receives GPS data and on-board sensor data from several connected vehicles indicating locations of nearby vehicles and objects. The system processes the data to create a shared-world model that includes locations and velocities of the connected vehicles and nearby vehicles and objects, and the system determines whether driving hazards exist, such as potential collisions. The system may transmit an alert to at least one of the connected vehicles, to cause the connected vehicle or a mobile device to present a warning message to a driver, such as a visual, audio, or haptic message, or to cause the connected vehicle to implement an action to avoid the driving hazard, such as activating emergency braking or altering course. The system may create, and transmit to a connected vehicle or mobile device, a lane-level traffic model indicating traffic density, traffic speed, and traffic throughput.

21 Claims, 8 Drawing Sheets

REAL-TIME TRAFFIC CONDITION WARNING SYSTEM

TECHNICAL FIELD

This disclosure relates generally to warnings based on real-time traffic conditions, and more particularly, to human-comprehendible warnings for drivers and/or actionable warnings for autonomous vehicles.

BACKGROUND

A connected vehicle (CV) and/or an autonomous vehicle (AV) includes on-board sensors that can detect objects in a vicinity of the CV and/or AV, for example, these sensors can determine locations of nearby vehicles and objects relative to the CV's or AV's location in terms of distances from the sensor to the nearby vehicles and objects. However, the range of on-board sensors is limited, for example, up to approximately several hundred meters for commonly used automotive lidar, radar, and cameras. Further, on-board sensors can be occluded by obstructions, e.g., nearby vehicles, that can cause the sensors to be unable to detect the environment behind such an obstruction. Thus, on-board sensors may be unable to provide data that can be used to generate timely human-comprehendible warnings for drivers and/or actionable warnings for autonomous vehicles.

SUMMARY

Disclosed herein are aspects, features, elements, implementations, and embodiments of fusing on-board sensor data from multiple vehicles that are within a common environment, e.g., that are in a predefined vicinity of each other, analyzing the fused data to determine whether any driving hazards exist, and sending an alert based on the driving hazard to one or more vehicles.

An aspect of the disclosed embodiments is a method, that may be performed by computing equipment of a data-processing center. The method includes: receiving recurrently, from a first vehicle, first GPS data indicating an absolute location of the first vehicle and first on-board sensor data indicating a relative location of each object in a first set of nearby objects; and receiving recurrently, from at least one second vehicle, a second GPS data indicating an absolute location of the at least one second vehicle and a second on-board sensor data indicating a relative location of each object in a second set of nearby objects.

The method further includes determining, based on the first GPS data and the first on-board sensor data, a velocity of the first vehicle and an absolute location and a velocity of one or more objects in the first set of nearby objects; and determining, based on the second GPS data and the second on-board sensor data, a velocity of the at least one second vehicle and an absolute location and a velocity of one or more objects in the second set of nearby objects;

The method further includes generating a shared-world model of vehicles and objects comprising the absolute locations and velocities of the first vehicle, the at least one second vehicle, the one or more objects in the first set of nearby objects, and the one or more objects in the second set of nearby objects; and representing each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model.

The method further includes determining whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and in response to the collision hazard existing, transmitting an alert to the first vehicle.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and systems disclosed herein will become more apparent by referring to the examples provided in the following description and drawings in which like reference numbers refer to like elements unless otherwise noted.

DETAILED DESCRIPTION

Figure 1:
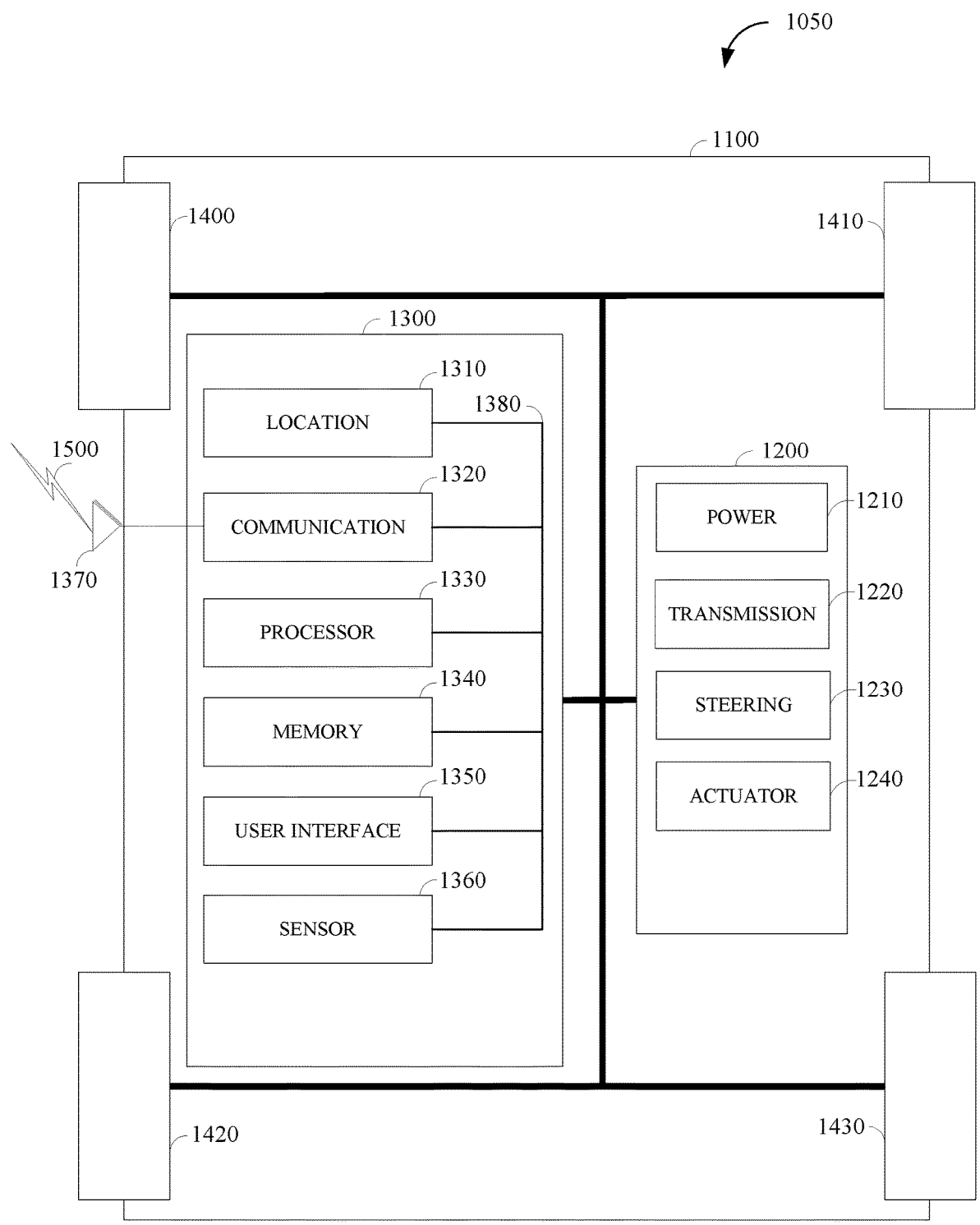
FIG. 1 is a diagram of an example of a portion of a vehicle in which the aspects, features, and elements disclosed herein may be implemented.

Today's vehicles include many sensors that can improve the driving experience, especially to improve driving safety. For example, it is common for vehicles to include a plurality of on-board sensors (and hardware and software systems for processing sensor data) for detecting nearby objects (e.g., other vehicles, stationary or moving objects, road damage, road obstructions, certain environmental conditions, and so on). On-board sensor-based object detection can be used to provide advanced warnings to a driver of a subject vehicle, or in the case of autonomous vehicles, can cause the autonomous subject vehicle to take evasive action to avoid a hazardous detected object.

Some on-board sensors include lidar, radar, sonar (ultrasonic), optical cameras, and infrared cameras. Each of these sensors has a distance range in which it can effectively and reliably detect nearby objects, and beyond which it cannot. For example, some automotive lidar, long-range radar (LRR), and medium field-of-view (FOV) camera sensors have respective distance ranges of around 200 meters. While this may be an adequate distance range to help a subject vehicle (driven by a human or driven autonomously) from colliding with an object, such collision avoidance actions may be abrupt and therefore uncomfortable for occupants of the subject vehicle and potentially dangerous to nearby vehicles. Further, the distance range of a sensor can be significantly reduced due to obstructions (e.g., surrounding vehicles) or non-ideal weather conditions (e.g., heavy rain or snow). Thus, it would be beneficial for the subject vehicle to be able to "detect" objects that are beyond the range(s) of its on-board sensor(s) or to "detect" objects that are that are occluded by obstructions. Further, it would be beneficial to alert the subject vehicle (e.g., alert a driver of the subject vehicle or alert an appropriate system of an autonomous subject vehicle) of any driving hazards that exist which may or may not be detected by the subject vehicle's on-board sensors.

Implementation described in this disclosure address such problems.

As described more fully below, a subject vehicle can receive, from a data-processing center, information that describes objects that are both within and beyond the distance ranges of its on-board sensors. Objects that are within the distance ranges of its on-board sensors and that are not occluded from detection by the sensors are objects that the subject vehicle can "see" or "detect" by means of on-board sensor data processed by data-processing systems; objects that are beyond distance ranges of its on-board sensors or that are occluded from detection by the sensors are objects that the subject vehicle cannot "see" or "detect" by means of on-board sensor data processed by data-processing systems. Thus, the information provided by the data-processing center may describe some objects that the subject vehicle can see and other objects that the subject vehicle cannot see. Of particular importance are objects that are ahead of the subject vehicle in its direction of travel.

The information provided by the data-processing center is a "shared-world model" of objects in a vicinity of the subject vehicle. The shared-world model is created by fusing on-board sensor data (which may be raw data and/or data describing identified objects) from multiple vehicles. For example, the subject vehicle and another vehicle each collect data describing nearby objects via their respective on-board sensors and each recurrently send their on-board sensor data (raw data or processed data) to the data-processing center (e.g., periodically). In addition, the subject vehicle and the other vehicle recurrently send their respective GPS locations to the data-processing center (e.g., periodically), so that hardware and software data-processing systems at or associated with the data-processing center can determine the relative locations of the subject vehicle and the other vehicle. If the subject vehicle and the other vehicle are less than a threshold distance apart or less than a threshold travel-time apart, then the on-board sensor data of the subject vehicle and the other vehicle are "fused," or combined, into a single shared-world model that is then sent back to at least one of the vehicles, e.g., to the subject vehicle. If the subject vehicle was trailing the other vehicle, the subject vehicle now has an improved perception of some or all of the objects that are ahead, i.e., the subject vehicle may be able to effectively "see" objects that are otherwise beyond the distance range of its on-board sensors or occluded by obstructions. This allows the subject vehicle to operate more safely, either by providing earlier or better warnings for its human driver, or in the case where the subject vehicle is an autonomous vehicle, by taking earlier or more gentle evasive action to avoid hazardous objects.

When driving hazards exists, there may be little time to react to avoid the hazard. Thus, it may be beneficial for the data-processing center, which may have greater computing power than what may available in the subject vehicle, to analyze the shared-world model to determine whether any driving hazards exists, and to send an alert to the subject vehicle for immediate processing, for example, to produce a warning message on a display of an infotainment system.

To describe some implementations in greater detail, reference is made to the following figures.

FIG. 1 is a diagram of an example of a vehicle 1050 in which the aspects, features, and elements disclosed herein may be implemented. The vehicle 1050 may include a chassis 1100, a powertrain 1200, a controller 1300, wheels 1400/1410/1420/1430, or any other element or combination of elements of a vehicle. Although the vehicle 1050 is shown as including four wheels 1400/1410/1420/1430 for simplicity, any other propulsion device or devices, such as a propeller or tread, may be used. In FIG. 1, the lines interconnecting elements, such as the powertrain 1200, the controller 1300, and the wheels 1400/1410/1420/1430, indicate that information, such as data or control signals, power, such as electrical power or torque, or both information and power, may be communicated between the respective elements. For example, the controller 1300 may receive power from the powertrain 1200 and communicate with the powertrain 1200, the wheels 1400/1410/1420/1430, or both, to control the vehicle 1050, which can include accelerating, decelerating, steering, or otherwise controlling the vehicle 1050.

The powertrain 1200 includes a power source 1210, a transmission 1220, a steering unit 1230, a vehicle actuator 1240, or any other element or combination of elements of a powertrain, such as a suspension, a drive shaft, axles, or an exhaust system. Although shown separately, the wheels 1400/1410/1420/1430 may be included in the powertrain 1200. A braking system may be included in the vehicle actuator 1240.

The power source 1210 may be any device or combination of devices operative to provide energy, such as electrical energy, chemical energy, or thermal energy. For example, the power source 1210 includes an engine, such as an internal combustion engine, an electric motor, or a combination of an internal combustion engine and an electric motor, and is operative to provide energy as a motive force to one or more of the wheels 1400/1410/1420/1430. In some embodiments, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy from the power source 1210 and transmits the energy to the wheels 1400/1410/1420/1430 to provide a motive force. The transmission 1220 may be controlled by the controller 1300, the vehicle actuator 1240 or both. The steering unit 1230 may be controlled by the controller 1300, the vehicle actuator 1240, or both and controls the wheels 1400/1410/1420/1430 to steer the vehicle. The vehicle actuator 1240 may receive signals from the controller 1300 and may actuate or control the power source 1210, the transmission 1220, the steering unit 1230, or any combination thereof to operate the vehicle 1050.

In some embodiments, the controller 1300 includes a location unit 1310, an electronic communication unit 1320, a processor 1330, a memory 1340, a user interface 1350, a sensor 1360, an electronic communication interface 1370, or any combination thereof. Although shown as a single unit, any one or more elements of the controller 1300 may be integrated into any number of separate physical units. For example, the user interface 1350 and processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof can be integrated in one or more electronic units, circuits, or chips.

In some embodiments, the processor 1330 includes any device or combination of devices capable of manipulating or processing a signal or other information now existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more an application-specific integrated circuits (ASICs), one or more field-programmable gate arrays (FPGAs), one or more programmable logic arrays (PLAs), one or more programmable logic controllers (PLCs), one or more state machines, or any combination thereof. The processor 1330 may be operatively coupled with the location unit 1310, the memory 1340, the electronic communication interface 1370, the electronic communication unit 1320, the user interface 1350, the sensor 1360, the powertrain 1200, or any combination thereof. For example, the processor may be operatively coupled with the memory 1340 via a communication bus 1380.

In some embodiments, the processor 1330 may be configured to execute instructions including instructions for remote operation which may be used to operate the vehicle 1050 from a remote location including a data-processing center. The instructions for remote operation may be stored in the vehicle 1050 or received from an external source such as a traffic management center, or server computing devices, which may include cloud-based server computing devices. The processor 1330 may be configured to execute instructions for following a projected path as described herein.

The memory 1340 may include any tangible non-transitory computer-usable or computer-readable medium, capable of, for example, containing, storing, communicating, or transporting machine readable instructions or any information associated therewith, for use by or in connection with the processor 1330. The memory 1340 is, for example, one or more solid state drives, one or more memory cards, one or more removable media, one or more read only memories, one or more random access memories, one or more solid-state drives, one or more disks, including a hard disk, a floppy disk, an optical disk, a magnetic or optical card, or any type of non-transitory media suitable for storing electronic information, or any combination thereof.

The electronic communication interface 1370 may be a wireless antenna, as shown, a wired communication port, an optical communication port, or any other wired or wireless unit capable of interfacing with a wired or wireless electronic communication medium 1500.

The electronic communication unit 1320 may be configured to transmit or receive signals via the wired or wireless electronic communication medium 1500, such as via the electronic communication interface 1370. Although not explicitly shown in FIG. 1, the electronic communication unit 1320 is configured to transmit, receive, or both via any wired or wireless communication medium, such as radio frequency (RF), ultraviolet (UV), visible light, fiber optic, wire line, or a combination thereof. Although FIG. 1 shows a single one of the electronic communication unit 1320 and a single one of the electronic communication interface 1370, any number of communication units and any number of communication interfaces may be used. In some embodiments, the electronic communication unit 1320 can include a dedicated short-range communications (DSRC) unit, a wireless safety unit (WSU), IEEE 802.11p (Wifi-P), a cellular communication unit such as a long-term evolution (LTE) or 5G transceiver, or a combination thereof.

The location unit 1310 may determine geolocation information, including but not limited to longitude, latitude, elevation, direction of travel, or speed, of the vehicle 1050. For example, the location unit includes a global positioning system (GPS) unit, such as a wide area augmentation system (WAAS) enabled National Marine-Electronics Association (NMEA) unit, a radio triangulation unit, or a combination thereof. The location unit 1310 can be used to obtain information that represents, for example, a current heading of the vehicle 1050, a current position of the vehicle 1050 in two or three dimensions, a current angular orientation of the vehicle 1050, or a combination thereof.

The user interface 1350 may include any unit capable of being used as an interface by a person, including any of a virtual keypad, a physical keypad, a touchpad, a display, a touchscreen, a speaker, a microphone, a video camera, a sensor, and a printer. The user interface 1350 may be operatively coupled with the processor 1330, as shown, or with any other element of the controller 1300. Although shown as a single unit, the user interface 1350 can include one or more physical units. For example, the user interface 1350 includes an audio interface for performing audio communication with a person, and a touch display for performing visual and touch based communication with the person.

The sensor 1360 may include one or more sensors, such as an array of sensors, which may be operable to provide information that may be used to control the vehicle. The sensor 1360 can provide information regarding current operating characteristics of the vehicle or its surrounding. The sensors 1360 include, for example, a speed sensor, acceleration sensors, a steering angle sensor, traction-related sensors, braking-related sensors, or any sensor, or combination of sensors, that is operable to report information regarding some aspect of the current dynamic situation of the vehicle 1050.

In some embodiments, the sensor 1360 may include sensors that are operable to obtain information regarding the physical environment surrounding the vehicle 1050. For example, one or more sensors detect road geometry and obstacles, such as fixed obstacles, vehicles, cyclists, and pedestrians. In some embodiments, the sensor 1360 can be or include one or more video cameras, laser-sensing systems, infrared-sensing systems, acoustic-sensing systems, or any other suitable type of on-vehicle environmental sensing device, or combination of devices, now known or later developed. In some embodiments, the sensor 1360 and the location unit 1310 are combined.

Although not shown separately, the vehicle 1050 may include a trajectory controller. For example, the controller 1300 may include a trajectory controller. The trajectory controller may be operable to obtain information describing a current state of the vehicle 1050 and a route planned for the vehicle 1050, and, based on this information, to determine and optimize a trajectory for the vehicle 1050. In some embodiments, the trajectory controller outputs signals operable to control the vehicle 1050 such that the vehicle 1050 follows the trajectory that is determined by the trajectory controller. For example, the output of the trajectory controller can be an optimized trajectory that may be supplied to the powertrain 1200, the wheels 1400/1410/1420/1430, or both. In some embodiments, the optimized trajectory can control inputs such as a set of steering angles, with each steering angle corresponding to a point in time or a position. In some embodiments, the optimized trajectory can be one or more paths, lines, curves, or a combination thereof.

One or more of the wheels 1400/1410/1420/1430 may be a steered wheel, which is pivoted to a steering angle under control of the steering unit 1230, a propelled wheel, which is torqued to propel the vehicle 1050 under control of the transmission 1220, or a steered and propelled wheel that steers and propels the vehicle 1050.

A vehicle may include units, or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

Figure 2:
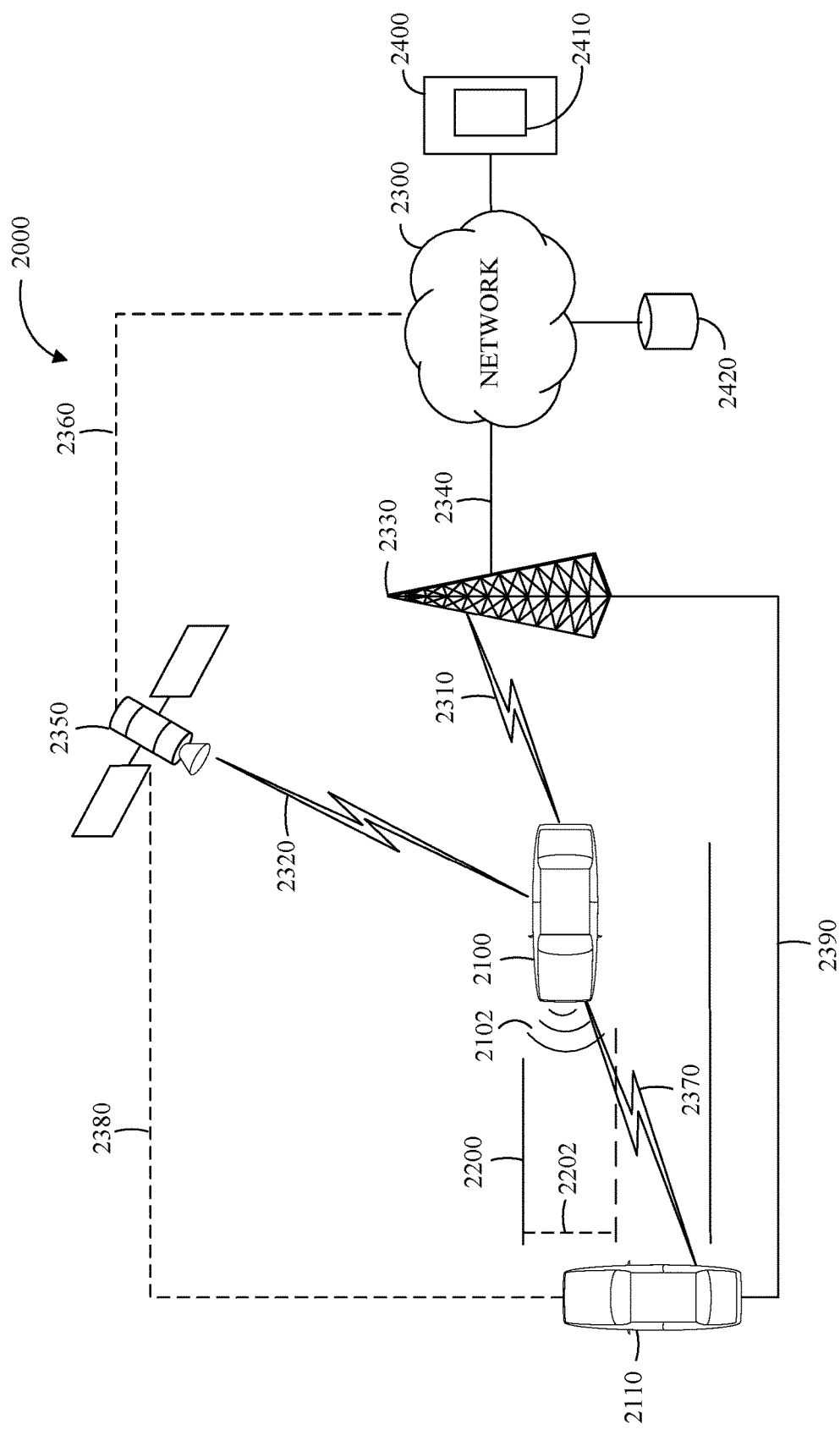
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system 2000 in which the aspects, features, and elements disclosed herein may be implemented. The vehicle transportation and communication system 2000 includes a vehicle 2100, such as the vehicle 1050 shown in FIG. 1, and one or more external objects, such as an external object 2110, which can include any form of transportation, such as the vehicle 1050 shown in FIG. 1, a pedestrian, cyclist, as well as any form of a structure, such as a building. The vehicle 2100 may travel via one or more portions of a transportation network 2200, and may communicate with the external object 2110 via one or more of an electronic communication network 2300. Although not explicitly shown in FIG. 2, a vehicle may traverse an area that is not expressly or completely included in a transportation network, such as an off-road area. In some embodiments the transportation network 2200 may include one or more of a vehicle detection sensor 2202, such as an inductive loop sensor, which may be used to detect the movement of vehicles on the transportation network 2200.

The electronic communication network 2300 may be a multiple-access system that provides for communication, such as voice communication, data communication, video communication, messaging communication, or a combination thereof, between the vehicle 2100, the external object 2110, and a data-processing center 2400. For example, the vehicle 2100 or the external object 2110 may send information to, or receive information from, the data-processing center 2400 or a database server 2420, via the electronic communication network 2300, such as information representing the transportation network 2200. The data-processing center 2400 includes a computing apparatus 2410, that includes some or all of the features of the computing device 3000 shown in FIG. 3. In some implementations, the data-processing center 2400 includes the database server 2420.

The database server 2420 is configured for storing data, and it may be implemented by a suitable computer storage medium.

The data-processing center 2400 can monitor and coordinate the movement of vehicles, including autonomous vehicles. The data-processing center 2400 may monitor the state or condition of vehicles, such as the vehicle 2100, and external objects, such as the external object 2110. The data-processing center 2400 can receive vehicle data and infrastructure data including any of: vehicle velocity; vehicle location; vehicle operational state; vehicle destination; vehicle route; vehicle sensor data; external object velocity; external object location; external object operational state; external object destination; external object route; and external object sensor data.

Further, the data-processing center 2400 can establish remote control over one or more vehicles, such as the vehicle 2100, or external objects, such as the external object 2110. In this way, the data-processing center 2400 may tele-operate the vehicles or external objects from a remote location. The computing apparatus 2410 may exchange (send or receive) state data with vehicles, external objects, or computing devices such as the vehicle 2100, the external object 2110, or the database server 2420, via a wireless communication link such as the wireless communication link 2380 or a wired communication link such as the wired communication link 2390.

In some embodiments, the vehicle 2100 or the external object 2110 communicates via the wired communication link 2390, a wireless communication link 2310/2320/2370, or a combination of any number or types of wired or wireless communication links. For example, as shown, the vehicle 2100 or the external object 2110 communicates via a terrestrial wireless communication link 2310, via a non-terrestrial wireless communication link 2320, or via a combination thereof. In some implementations, a terrestrial wireless communication link 2310 includes an Ethernet link, a serial link, a Bluetooth link, an infrared (IR) link, an ultraviolet (UV) link, or any link capable of providing for electronic communication.

A vehicle, such as the vehicle 2100, or an external object, such as the external object 2110, may communicate with another vehicle, external object, or the data-processing center 2400. For example, a host, or subject, vehicle 2100 may receive one or more automated inter-vehicle messages, such as a basic safety message (BSM), from the data-processing center 2400, via a direct communication link 2370, or via an electronic communication network 2300. For example, data-processing center 2400 may broadcast the message to host vehicles within a defined broadcast range, such as three hundred meters, or to a defined geographical area. In some embodiments, the vehicle 2100 receives a message via a third party, such as a signal repeater (not shown) or another remote vehicle (not shown). In some embodiments, the vehicle 2100 or the external object 2110 transmits one or more automated inter-vehicle messages periodically based on a defined interval, such as one hundred milliseconds.

Automated inter-vehicle messages may include vehicle identification information, geospatial state information, such as longitude, latitude, or elevation information, geospatial location accuracy information, kinematic state information, such as vehicle acceleration information, yaw rate information, speed information, vehicle heading information, braking system state data, throttle information, steering wheel angle information, or vehicle routing information, or vehicle operating state information, such as vehicle size information, headlight state information, turn signal information, wiper state data, transmission information, or any other information, or combination of information, relevant to the transmitting vehicle state. For example, transmission state information indicates whether the transmission of the transmitting vehicle is in a neutral state, a parked state, a forward state, or a reverse state.

In some embodiments, the vehicle 2100 communicates with the electronic communication network 2300 via an access point 2330. The access point 2330, which may include a computing device, may be configured to communicate with the vehicle 2100, with the electronic communication network 2300, with the data-processing center 2400, or with a combination thereof via wired or wireless communication links 2310/2340. For example, an access point 2330 is a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit, an access point can include any number of interconnected elements.

The vehicle 2100 may communicate with the electronic communication network 2300 via a satellite 2350, or other non-terrestrial communication device. The satellite 2350, which may include a computing device, may be configured to communicate with the vehicle 2100, with the electronic communication network 2300, with the data-processing center 2400, or with a combination thereof via one or more communication links 2320/2360. Although shown as a single unit, a satellite can include any number of interconnected elements.

The electronic communication network 2300 may be any type of network configured to provide for voice, data, or any other type of electronic communication. For example, the electronic communication network 2300 includes a local area network (LAN), a wide area network (WAN), a virtual private network (VPN), a mobile or cellular telephone network, the Internet, or any other electronic communication system. The electronic communication network 2300 may use a communication protocol, such as the transmission control protocol (TCP), the user datagram protocol (UDP), the internet protocol (IP), the real-time transport protocol (RTP) the Hyper Text Transport Protocol (HTTP), or a combination thereof. Although shown as a single unit, an electronic communication network can include any number of interconnected elements.

In some embodiments, the vehicle 2100 communicates with the data-processing center 2400 via the electronic communication network 2300, access point 2330, or satellite 2350. The data-processing center 2400 may include one or more computing devices, which are able to exchange (send or receive) data from: vehicles such as the vehicle 2100; external objects including the external object 2110; or storage devices such as the database server 2420.

In some embodiments, the vehicle 2100 identifies a portion or condition of the transportation network 2200. For example, the vehicle 2100 may include one or more on-vehicle sensors 2102, such as the sensor 1360 shown in FIG. 1, which includes a speed sensor, a wheel speed sensor, a camera, a gyroscope, an optical sensor, a laser sensor, a radar sensor, a sonic sensor (e.g., a microphone or acoustic sensor), a compass, or any other sensor or device or combination thereof capable of determining or identifying a portion or condition of the transportation network 2200.

The vehicle 2100 may traverse one or more portions of the transportation network 2200 using information communicated via the electronic communication network 2300, such as information representing the transportation network 2200, information identified by one or more on-vehicle sensors 2102, or a combination thereof. The external object 2110 may be capable of all or some of the communications and actions described above with respect to the vehicle 2100.

For simplicity, FIG. 2 shows the vehicle 2100 as the host vehicle, the external object 2110, the transportation network 2200, the electronic communication network 2300, and the data-processing center 2400. However, any number of vehicles, networks, or computing devices may be used. In some embodiments, the vehicle transportation and communication system 2000 includes devices, units, or elements not shown in FIG. 2. Although the vehicle 2100 or external object 2110 is shown as a single unit, a vehicle can include any number of interconnected elements.

Although the vehicle 2100 is shown communicating with the data-processing center 2400 via the electronic communication network 2300, the vehicle 2100 (and external object 2110) may communicate with the data-processing center 2400 via any number of direct or indirect communication links. For example, the vehicle 2100 or external object 2110 may communicate with the data-processing center 2400 via a direct communication link, such as a Bluetooth communication link. Although, for simplicity, FIG. 2 shows one of the transportation network 2200, and one of the electronic communication network 2300, any number of networks or communication devices may be used. The vehicle 2100 (and external object 2110) can be monitored or coordinated by the data-processing center 2400, can be operated autonomously or by a human driver, and can exchange (send and receive) vehicle data relating to the state or condition of the vehicle and its surroundings including any of vehicle velocity (e.g., vehicle speed and vehicle trajectory, or heading); vehicle location; vehicle operational state; vehicle destination; vehicle route; vehicle sensor data; external object velocity; external object location, and so on.

Figure 3:
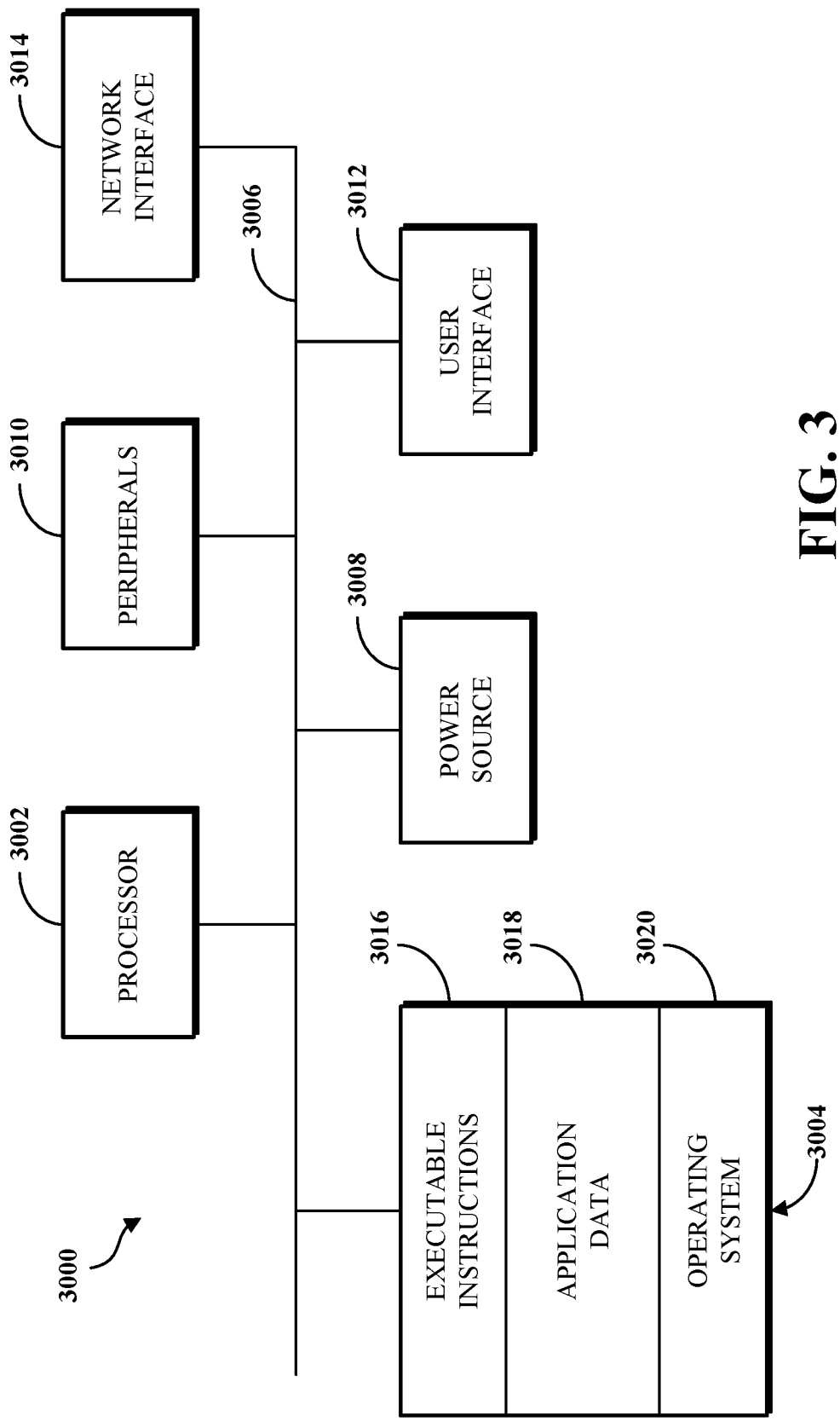
FIG. 3 is a block diagram of an example internal configuration of a computing device of an electronic computing and communications system in which the aspects, features, and elements disclosed herein may be implemented.

FIG. 3 shows a block diagram of an example of a computing device 3000 capable of performing functions described later herein. The computing device 3000 includes components or units, such as a processor 3002, a memory 3004, a bus 3006, a power source 3008, peripherals 3010, a user interface 3012, a network interface 3014, other suitable components, or a combination thereof. One or more of the memory 3004, the power source 3008, the peripherals 3010, the user interface 3012, or the network interface 3014 can communicate with the processor 3002 via the bus 3006.

The processor 3002 is a central processing unit, such as a microprocessor, and can include single or multiple processors having single or multiple processing cores. Alternatively, the processor 3002 can include another type of device, or multiple devices, configured for manipulating or processing information. For example, the processor 3002 can include multiple processors interconnected in one or more manners, including hardwired or networked. The operations of the processor 3002 can be distributed across multiple devices or units that can be coupled directly or across a local area or other suitable type of network. The processor 3002 can include a cache, or cache memory, for local storage of operating data or instructions.

The memory 3004 includes one or more memory components, which may each be volatile memory or non-volatile memory. For example, the volatile memory can be random access memory (RAM) (e.g., a DRAM module, such as DDR SDRAM). In another example, the non-volatile memory of the memory 3004 can be a disk drive, a solid state drive, flash memory, or phase-change memory. In some implementations, the memory 3004 can be distributed across multiple devices. For example, the memory 3004 can include network-based memory or memory in multiple clients or servers performing the operations of those multiple devices.

The memory 3004 can include data for immediate access by the processor 3002. For example, the memory 3004 can include executable instructions 3016, application data 3018, and an operating system 3020. The executable instructions 3016 can include one or more application programs, which can be loaded or copied, in whole or in part, from nonvolatile memory to volatile memory to be executed by the processor 3002. For example, the executable instructions 3016 can include instructions for performing techniques of this disclosure. In some implementations, the application data 3018 can include functional programs, such as a computational programs, analytical programs, database programs, and so on. The operating system 3020 can be, for example, Microsoft Windows®, Mac OS X®, or Linux®; an operating system for a mobile device, such as a smartphone or tablet device; or an operating system for a non-mobile device, such as a mainframe computer.

The power source 3008 provides power to the computing device 3000. For example, the power source 3008 can be an interface to an external power distribution system. In another example, the power source 3008 can be a battery, such as where the computing device 3000 is a mobile device or is otherwise configured to operate independently of an external power distribution system. In some implementations, the computing device 3000 may include or otherwise use multiple power sources. In some such implementations, the power source 3008 can be a backup battery.

The peripherals 3010 may include one or more sensors, detectors, or other devices configured for monitoring the computing device 3000 or the environment around the computing device 3000. For example, the peripherals 3010 can include a geolocation component, such as a global positioning system (GPS) location unit. In another example, the peripherals can include a temperature sensor for measuring temperatures of components of the computing device 3000, such as the processor 3002. In some implementations, the computing device 3000 can omit the peripherals 3010.

The user interface 3012 includes one or more input interfaces and/or output interfaces. An input interface may, for example, be a positional input device, such as a mouse, touchpad, touchscreen, or the like; a keyboard; or another suitable human or machine interface device. An output interface may, for example, be a display, such as a liquid crystal display, a cathode-ray tube, a light emitting diode display, or other suitable display.

The network interface 3014 provides a connection or link to a network (e.g., the electronic communication network 2300 shown in FIG. 2). The network interface 3014 can be a wired network interface or a wireless network interface. The computing device 3000 can communicate with other devices via the network interface 3014 using one or more network protocols, such as using Ethernet, transmission control protocol (TCP), internet protocol (IP), power line communication, an IEEE 802.X protocol (e.g., Wi-Fi, Bluetooth, or ZigBee), infrared, visible light, general packet radio service (GPRS), global system for mobile communications (GSM), code-division multiple access (CDMA), Z-Wave, another protocol, or a combination thereof. For example, the computing device 3000 can communicate with a database server, such as the database server 2420 of FIG. 2.

In the description herein, sentences describing the autonomous vehicle as taking an action (such as performing, determining, initiating, receiving, calculating, deciding, etc.) are to be understood that some appropriate module of the AV as taking the action. Such modules may be stored in a memory of the AV, such as the memory 1340 of FIG. 1, and executed by a processor, such as the processor 1330 of FIG. 1. Such modules may be partially or fully included in a controller apparatus, such as the computing apparatus 2410 of FIG. 2 and may be partially or fully executed by a processor of the AV, a processor of a data-processing center, or a combination thereof. For example, the statement "the AV determines a trajectory" can be understood to mean that "a module of the AV determines a trajectory" or "a trajectory planning module of the AV determines a trajectory."

Figure 4:
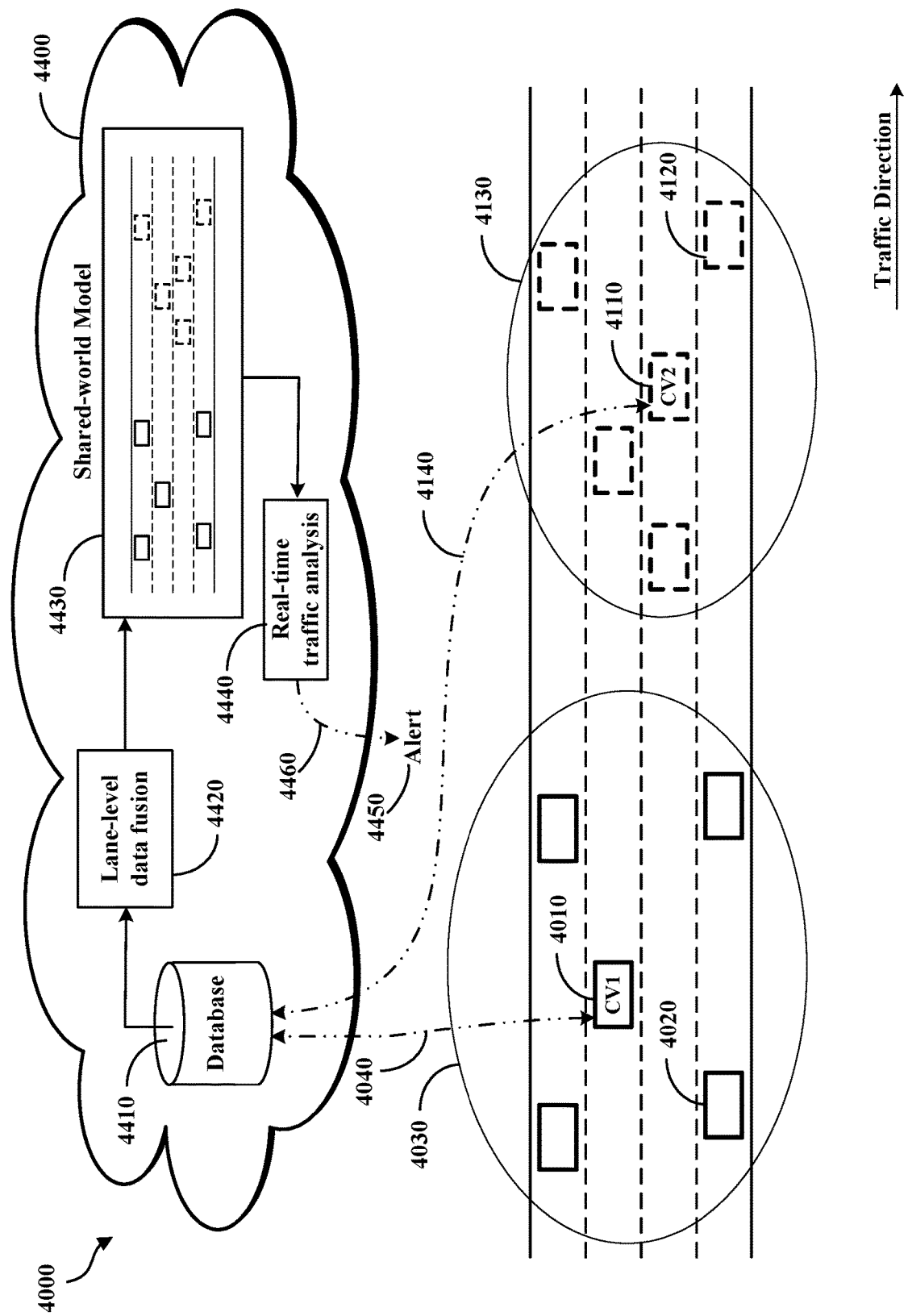
FIG. 4 is a diagram of an example of a system for determining a shared-world model.

FIG. 4 is an example of a system 4000 for determining a shared-world model. A first connected vehicle (CV1) 4010 utilizes its on-board sensors to detect the objects 4020 (shown as solid-line rectangles). These objects 4020 may be other moving or stationary vehicles, stationary or moving objects, road damage, road obstructions, and so on). The sensor range 4030 of the first connected vehicle 4010 is depicted by the oval surrounding the first connected vehicle 4010. Around the same time, a second connected vehicle (CV2) 4110 utilizes its on-board sensors to detect the objects 4120 (shown as dashed-line rectangles). These objects 4120 may be other moving or stationary vehicles, stationary or moving objects, road damage, road obstructions, and so on). The sensor range 4130 of the second connected vehicle 4110 is depicted by the oval surrounding the second connected vehicle 4110. In practice, a sensor range, e.g., the sensor range 4030 or the sensor range 4130, may be asymmetric and/or have an arbitrary shape, for example extending further in the direction of travel, and the sensor range may represent a maximum distance range of one on-board sensor, a maximum combined distance range of several (or all) of the on-board sensors, or another suitable function or combination of distance ranges of the one or more on-board sensors. The respective on-board sensors of the first connected vehicle 4010 and the second connected vehicle 4110 may be implemented by the sensor 1360 of FIG. 1, and the respective on-board sensor data may be stored in the memory 1340 of FIG. 1 and processed by the processor 1330 of FIG. 1. Both the first connected vehicle 4010 and the second connected vehicle 4110 utilize on-board GPS sensors to ascertain their respective absolute locations. The respective GPS sensors may be implemented by the location unit 1310 of FIG. 1.

The first connected vehicle 4010 transmits its on-board sensor data, either in raw or processed form, and its GPS data via a network connection 4040 to a data-processing center 4400. Similarly, the second connected vehicle 4110 transmits its on-board sensor data, either in raw or processed form, and its GPS data via a network connection 4140 to the data-processing center 4400. The first connected vehicle 4010 and the second connected vehicle 4110 may each additionally send, to the data-processing center 4400, information identifying itself, such as a unique identifier or unique network address, such that the data-processing center 4400 will be able to specifically address the first connected vehicle 4010 and/or the second connected vehicle 4110 for transmitting information back to these respective vehicles. For example, the data-processing center 4400 may transmit one or more of the shared-world model 4430, a lane-level traffic model (discussed later herein), an alert 4450 (discussed later herein), or other information relevant to human or autonomous driving operations of the respective vehicles. Such transmissions may be implemented via the wired or wireless electronic communication medium 1500 of FIG. 1, that may be accessed via the electronic communication interface 1370 of FIG. 1. The wired or wireless electronic communication medium 1500 may be comprised in the electronic communication network 2300 of FIG. 2.

The data-processing center 4400 may be implemented via the data-processing center 2400 of FIG. 2. The data-processing center 4400 may comprise or be associated with a database 4410 for storing received on-board sensor data, GPS data, unique identifiers, and so on. The database 4410 may be implemented by the database server 2420 of FIG. 2. A lane-level data fusion unit 4420 accesses the data stored in the database 4410 to create or update a shared-world model 4430. The lane-level data fusion unit 4420 may be implemented by the computing apparatus 2410 of FIG. 2. A real-time traffic analysis unit 4440 analyzes the shared-world model 4430 for various purposes, such as to detect potential collisions between vehicles (e.g., "collision hazards"), to determine which lanes are more congested or less congested, and so on. The real-time traffic analysis unit 4440 may be implemented by the computing apparatus 2410 of FIG. 2.

The shared-world model 4430 is the result of fusion of data, received from the first connected vehicle 4010 and the second connected vehicle 4110, by the lane-level data fusion unit 4420. The lane-level data fusion unit 4420 compares the received GPS locations (i.e., absolute locations) of the first connected vehicle 4010 and the second connected vehicle 4110 to determine whether the first connected vehicle 4010 and the second connected vehicle 4110 are close enough to warrant combining their respective on-board sensor data into the shared-world model 4430. The criteria for "close enough" may include a threshold distance between the first connected vehicle 4010 and the second connected vehicle 4110, a threshold travel-time between the first connected vehicle 4010 and the second connected vehicle 4110 (i.e., how long it will take the lagging vehicle to reach the current location of the leading vehicle), or other suitable criteria. The criteria may be predefined or variable, where variable criteria may depend on factors such as the amount of on-board sensor data received from respective connected vehicles, a quantity of connected vehicles transmitting on-board sensor data, computational and/or memory limitations, network conditions (e.g., latency, bandwidth, network congestion, etc.), and so on. As a simple example, the lane-level data fusion unit 4420 may determine to fuse data from two vehicles if they are less than 1000 m apart. While there is usually no reason to fuse data from vehicles that are miles apart because, by the time the lagging vehicle catches up to the location of the leading vehicle, the on-board sensor data of the leading vehicle when it was at that location will likely be stale. However, in limited circumstances, for example, if the leading vehicle detected a stationary hazard in the road, it may make sense to fuse the on-board sensor data of these vehicles and transmit the shared-world model to the lagging vehicle.

The data sent by the first connected vehicle 4010 and the second connected vehicle 4110 (and other connected vehicles) to the data-processing center 4400 may comprise raw data collected from on-board sensors, and/or it may comprise processed data that includes identification of the types of objects detected, their relative or absolute speeds, their relative or absolute trajectories, and so on. Based on the received data, the lane-level data fusion unit 4420 can estimate a lane (of a road) where each object is located. For example, if a subject vehicle periodically transmits data to the data-processing center 4400 (e.g., once per second), the lane-level data fusion unit 4420 can determine paths of each object based on where those objects were located as a function of time and infer that parallel paths demarcate lanes of a road.

The shared-world model 4430 may be periodically updated by the lane-level data fusion unit 4420 as the data-processing center 4400 receives updated data from the first connected vehicle 4010 and the second connected vehicle 4110. Each update from each vehicle may be considered a "frame," such that a sequence of frames resembles successive snapshots in time. However, an object that was detected by a subject vehicle's on-board sensors in a previous frame may not be detected in a next frame, or a next quantity of frames, if, for example, another vehicle came between the object and the subject vehicle's on-board sensors and thereby occluded the subject vehicle's on-board sensors. During the frames where the object is missing, the lane-level data fusion unit 4420 can estimate the location of the missing object based on the object's previous location, speed, and trajectory. For each frame where the object's location is estimated, the lane-level data fusion unit 4420 can assign a confidence score indicating a likelihood that the actual object is located at the estimated location, where the confidence score would decrease the longer the object remains undetected by the subject vehicle's on-board sensors. At some point, for example, when the confidence score drops below a predefined threshold, the missing object would be removed from the shared-world model 4430. This confidence score may be referred to herein as an "estimation confidence score" to distinguish it from another confidence score described later. Other parameters of an object in the shared-world model 4430 can be estimated as well, such as trajectory and speed, which would also be subject to an estimation confidence score.

The data-processing center 4400 can periodically transmit the shared-world model 4430 (or a representation thereof) to one or both of the first connected vehicle 4010 or the second connected vehicle 4110, where the shared-world model 4430 could be further processed for improving driving safety, driving comfort, and so on. Such transmissions may be implemented via the wired or wireless electronic communication medium 1500 of FIG. 1, that may be accessed via the electronic communication interface 1370 of FIG. 1. The wired or wireless electronic communication medium 1500 may be comprised in the electronic communication network 2300 of FIG. 2. The processing of the shared-world model 4430 may be implemented by the processor 1330 and memory 1340 of FIG. 1. Improving driving safety may be implemented by providing a visual or audio alert to a driver in case of upcoming danger, e.g., flashing a warning message on an infotainment system or a head-up display, playing a warning message on the speakers, and so on. Improving driving comfort may be implemented by automatically reducing the vehicles speed well in advance of upcoming traffic congestion to avoid more abrupt emergency braking.

Instead of (or in addition to) sending the shared-world model 4430 to one or both of the first connected vehicle 4010 or the second connected vehicle 4110 for analysis, the real-time traffic analysis unit 4440 of the data-processing center 4400 can analyze the shared-world model 4430 to determine whether a collision hazard exists, and send an "alert" message to one or both of the first connected vehicle 4010 or the second connected vehicle 4110. Analyzing the shared-world model 4430 by the data-processing center 4400, as opposed to by the first connected vehicle 4010 or the second connected vehicle 4110, may be beneficial because the data-processing center 4400 may have greater computing power and/or memory resources and could therefore perform the analysis more quickly. This may be critical in some instances when there is little time to react to the collision hazard to avoid a collision. Additionally, transmitting the shared-world model 4430 (or a representation thereof) may be slow due to a potentially large size of the shared-world model 4430, in which case, transmitting a shorter "alert" message may be faster.

The real-time traffic analysis unit 4440 of the data-processing center 4400 can determine whether a collision hazard exists by determining whether a first vehicle, e.g., the first connected vehicle 4010, is on a collision course with another vehicle or object, e.g., the object 4020, and whether a difference between the velocity of the first vehicle and the velocity of the other vehicle or object is greater than a threshold velocity. Velocity is a vector quantity that describes a speed and a direction (e.g., a trajectory or heading) of a vehicle or an object. If the real-time traffic analysis unit 4440 determines that a collision hazard exists, the data-processing center 4400 can transmit an alert 4450 to the first vehicle, and potentially to the other vehicle if that other vehicle is a connected vehicle capable of receiving alerts from the data-processing center 4400. The alert 4450 may be transmitted via a network connection 4460, which may be a wired or wireless electronic communication medium 1500 of FIG. 1, that may be accessed via the electronic communication interface 1370 of FIG. 1.

In some implementations, the data-processing center 4400 may take into consideration the estimation confidence score of the other vehicle or object when determining whether to send the alert 4450 or what information to include in the alert 4450. For example, if the estimation confidence score is very low, the estimated location and/or estimated velocity of the other vehicle or object in the shared-world model 4430 may not accurately describe the actual location and/or actual velocity of the other vehicle or object due to accumulated estimation errors over a non-trivial amount of time since the data-processing center 4400 received an indication of a relative location of the other vehicle or object. Thus, the collision hazard may be a false positive, and sending the alert 4450 may unnecessarily panic a driver of the first vehicle. The alert 4450 may still be sent, however, but the information included in the alert 4450 may be softened or generalized, for example, "there may be a vehicle on your right," compared to more specific information like "stop merging right, collision is imminent." The non-trivial amount of time depends on several factors, for example, the velocity of the first vehicle, the velocity of the other vehicle or object, the size of the first vehicle, the size of the other vehicle or object, and so on. For example, estimated absolute locations for slow moving vehicles may be reasonable accurate for tens of seconds, whereas estimated absolute locations for fast moving vehicles may become inaccurate within one or two seconds.

Sending the alert 4450 to a vehicle, e.g., the first connected vehicle 4010, (and assuming correct and timely receipt of the alert 4450 by the vehicle) may cause the vehicle to produce a human-comprehendible message, for example, a visual message presented via a graphical interface of an infotainment system, a head-up display, or a mobile device; an audio message presented via a speaker of the infotainment system or the mobile device; a haptic message presented via a seat vibrator or the mobile device, and so on.

Figure 7A:
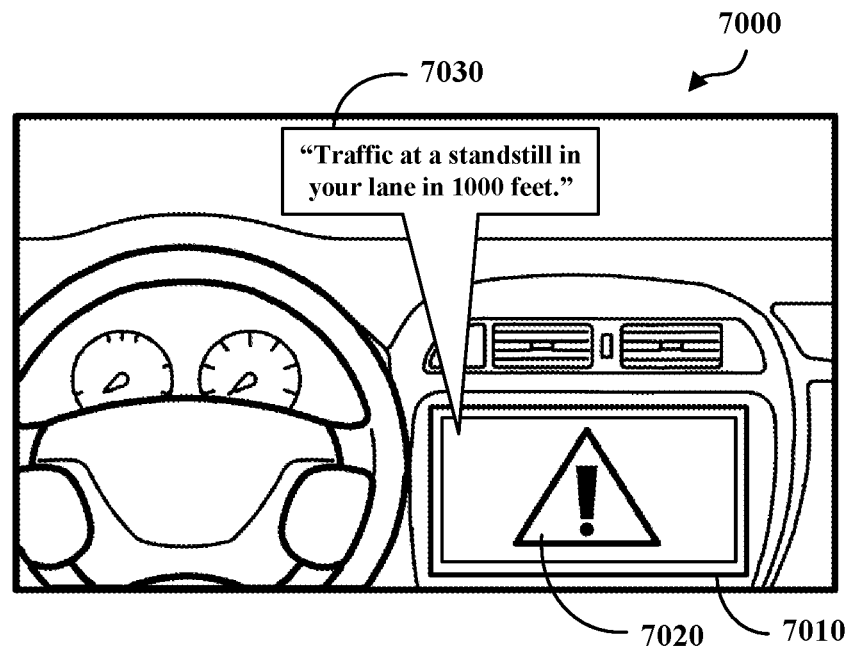
FIG. 7A is an example of a traffic alert message presented by an infotainment system of a vehicle.

FIG. 7A is an example of a system 7000 depicting an interior of a vehicle (e.g., a driver's cockpit or console) that comprises an infotainment graphical display 7010 and an audio speaker system (not shown in FIG. 7A). In this example, the graphical display 7010 presents a large warning symbol 7020 intended to capture the driver's attention, and the audio speaker system presents an audio message 7030 providing further details about the hazard indicated by the received alert 4450. The graphical display 7010 may display additional information, e.g., text that provides further details about the hazard. The vehicle may include other user interfaces, e.g., the user interface 1350 of FIG. 1, capable of presenting or conveying information related to the alert 4450 to a driver. For example, the alert 4450 may indicate that the vehicle is likely to collide with a nearby vehicle in an adjacent lane if the current lane-changing activity continues (as determined by the data-processing center 4400 according to the shared-world model 4430, where the nearby vehicle may be in a blind-spot of the on-board sensors of the vehicle). In this case the alert 4450 may cause a seat vibrator on a side adjacent to the nearby vehicle to vibrate, or the alert 4450 may cause a blind-spot alert light mounted on a side mirror adjacent to the nearby vehicle to illuminate.

Figure 7B:
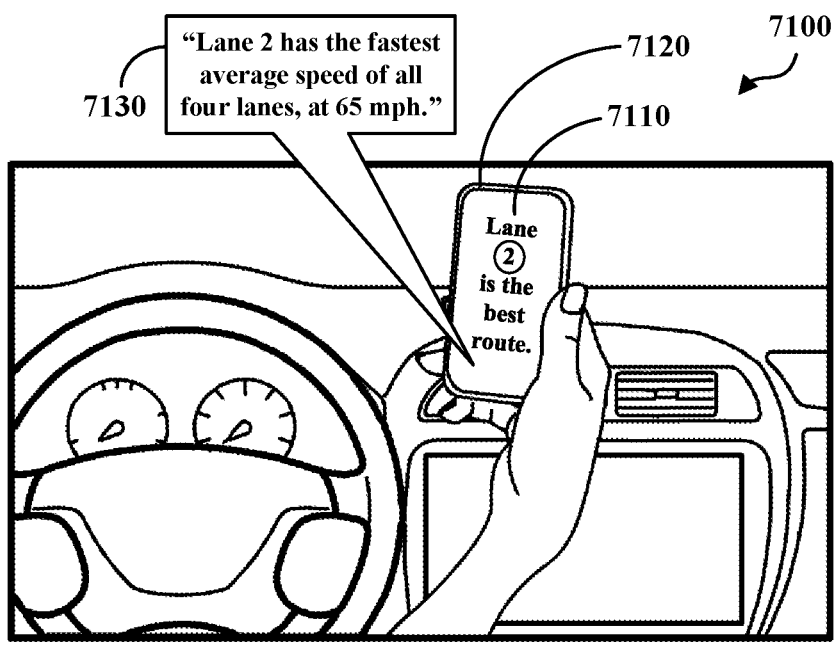
FIG. 7B is an example of a traffic alert message presented by a mobile device.

FIG. 7B is an example of a system 7100 depicting the same interior of a vehicle as shown in FIG. 7A. In this example, the driver of the vehicle receives the alert 4450 via a mobile device 7120, e.g., a mobile phone or a tablet, that comprises a graphical display 7110 and an audio speaker system (not shown in FIG. 7B). The graphical display 7110 presents a message to the driver, "Lane 2 is the best route," and the audio speaker system presents an audio message 7130 providing further details about the hazard indicated by the received alert 4450. In some implementations, the mobile device 7120 may vibrate in response to receiving the alert 4450. The mobile device 7120 may include some or all of the features of the computing device 3000 shown in FIG. 3. Specifically, the mobile device may receive the alert 4450 via the network interface 3014, it may store the alert 4450 in the memory 3004, it may process or otherwise analyze the alert 4450 via the processor 3002, and it may present a visual message, an audio message, a haptic message (e.g., vibration), and so on, via the user interface 3012. In some implementations, the mobile device 7120 may receive the alert 4450 via a connection to a cellular network, e.g., 5G. In some implementations, the mobile device 7120 may receive the alert 4450 via a connection to a near-field network, e.g., a Bluetooth connection to the vehicle where the vehicle receives the alert 4450 from the data-processing center 4400 and relays (e.g., forwards) the alert 4450 to the mobile device 7120.

Sending the alert 4450 to a vehicle, e.g., the first connected vehicle 4010, (and assuming correct and timely receipt of the alert 4450 by the vehicle) may additionally or alternatively cause the vehicle to implement an action that may include modifying a speed of the vehicle, e.g., automatically activating the vehicle's brakes (e.g., the vehicle actuator 1240 of FIG. 1), and/or modifying a trajectory of the vehicle, e.g., activating the vehicle's steering system (e.g., steering unit 1230 of FIG. 1). Some of these actions, like emergency braking, may be implemented in a human-driven vehicle, and some of these actions, like swerving to avoid an object, may be implemented in an autonomous vehicle.

Figure 5:
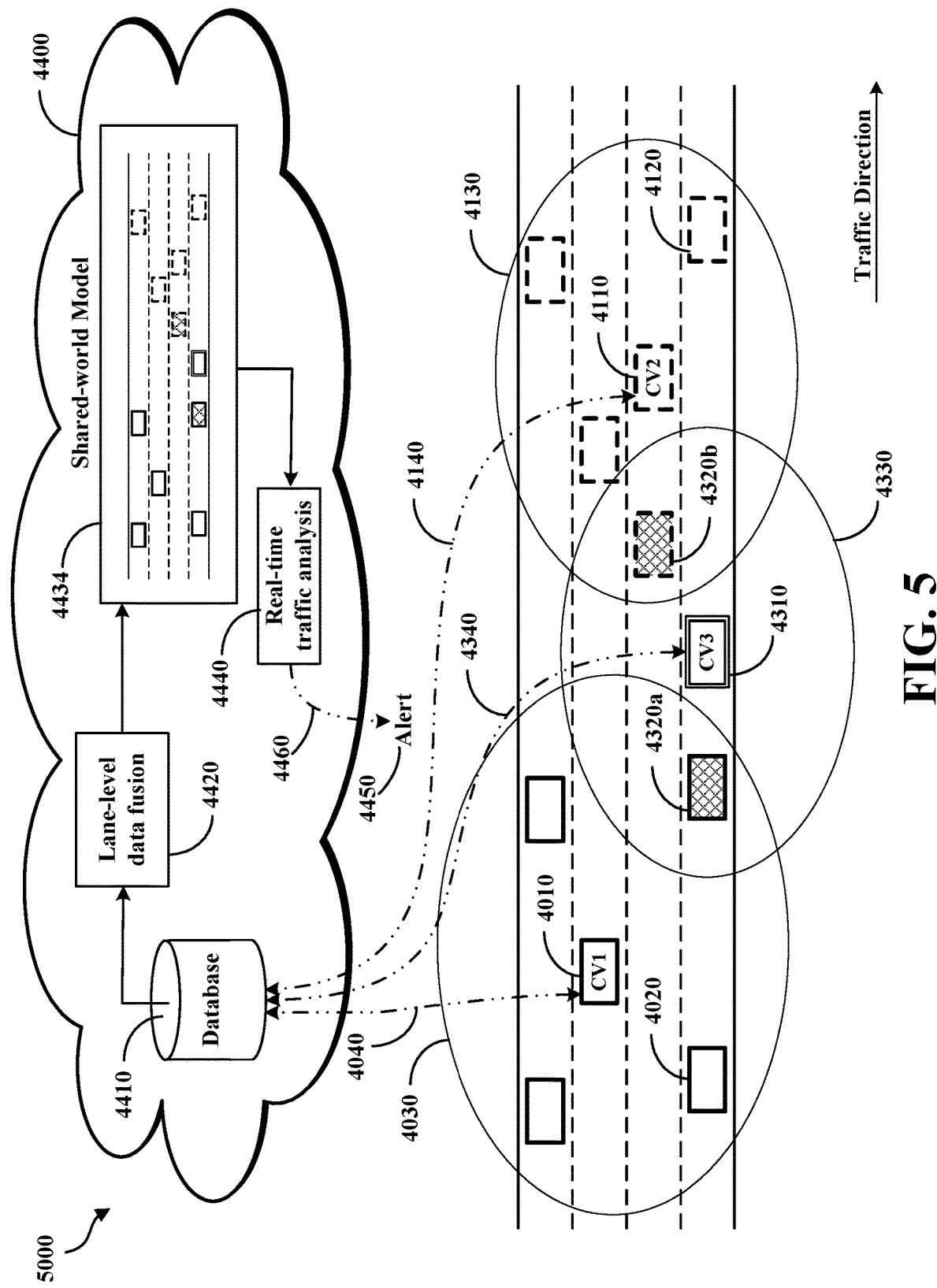
FIG. 5 is a diagram of an example of a system for determining a shared-world model where there is sensor-range overlap between vehicles.

FIG. 5 is an example of the system 4000 for determining a shared-world model 4434 where there is sensor-range overlap between vehicles. The first connected vehicle (CV1) 4010 utilizes its on-board sensors to detect the objects 4020 (shown as solid-line rectangles) within its sensor range 4030, and the second connected vehicle (CV2) 4110 utilizes its on-board sensors to detect the objects 4120 (shown as dashed-line rectangles) within its sensor range 4130. A third connected vehicle (CV3) 4310, positioned approximately between the first connected vehicle 4010 and the second connected vehicle 4110, utilizes its on-board sensors to detect the object 4320a (shown as a solid-line rectangle filled with crosshatch) and the object 4320b (shown as a dashed-line rectangle filled with crosshatch) within its sensor range 4330. Object 4320a is detected by both the first connected vehicle 4010 and the third connected vehicle 4310, and object 4320b is detected by both the second connected vehicle 4110 and the third connected vehicle 4310.

The first, second, and third connected vehicles 4010, 4110, and 4310 each transmit its on-board sensor data, either in raw or processed form, and its GPS data via respective network connections 4040, 4140, and 4340 to the data-processing center 4400, where such data may be stored in the database 4410 and processed by the lane-level data fusion unit 4420 to generate the shared-world model 4434, which may be an updated version of the shared-world model 4430 of FIG. 4. The lane-level data fusion unit 4420 determines an absolute location of each object 4020 and the object 4320a based on the GPS data received from the first connected vehicle 4010 (which describes the absolute location of the first connected vehicle 4010) and the relative location of each object 4020 and the object 4320a based on the on-board sensor data also received from the first connected vehicle 4010. Similarly, the lane-level data fusion unit 4420 determines an absolute location of the object 4320a and 4320b based on the GPS data received from the third connected vehicle 4310 (which describes the absolute location of the third connected vehicle 4310) and the relative location of the object 4320a and the object 432ba based on the on-board sensor data also received from the third connected vehicle 4310. If the lane-level data fusion unit 4420 determines that the absolute location of the object 4320a, as determined from the data received from the first connected vehicle 4010, is within a threshold distance of the absolute location of the object 4320a, as determined from the data received from the third connected vehicle 4310, then the lane-level data fusion unit 4420 merges the two independently determined representations of the object 4320a into a single object in the shared-world model 4434. A similar process occurs for the object 4320b, which is detected by both the second connected vehicle 4110 and the third connected vehicle 4310.

The "merged" absolute location of the single object may be determined via a suitable function. In some implementations, the merged absolute location may be a simple average of the absolute locations the objects that are merged. In some implementations, the merged absolute location may be a weighted average of the absolute locations of the objects that are merged, where the weights may be based on one or more suitable parameters. Some parameters include: relative distance (e.g., larger weights applied to absolute locations that were determined from shorter relative distances, i.e., the detected object was closer to the on-board sensor(s) that detected the object); sensor types (e.g., larger weights applied to absolute locations that were determined based on lidar sensors (as an example), and smaller weights applied to absolute locations that were determined based on acoustic sensors (as an example); time elapsed since receiving updated GPS data and/or on-board sensor data (e.g., larger weights applied to absolute locations determined from more recent data); on-board sensor accuracy; GPS accuracy, and so on.

In some implementations, the threshold distance for merging objects is 5 meters. In some implementations, the threshold distance may be a function of a time difference between timestamps associated with the data received at the data-processing center 4400 from different connected vehicles. For example, the distance threshold may be directly proportional to the difference between timestamps, e.g., in an implementation where the lane-level data fusion unit 4420 can account for travel time and travel distance of the different connected vehicles, or the distance threshold may be inversely proportional to the difference in timestamps, e.g., in an implementation where it is important to reduce a likelihood of erroneously merging objects. A timestamp associated with data may indicate a time when the data was sensed by a sensor, a time when the data was transmitted to the data-processing center 4400, a time when the data was received at the data-processing center, or another appropriate time.

In some implementations, the lane-level data fusion unit 4420 can assign a confidence score that indicates a certainty of an object's location based on a quantity of on-board sensors that detected the object (at a given time or during a predefined time interval). This confidence score may be referred to herein as a "detections confidence score" to distinguish it from the "estimation confidence score" described earlier. First, the detections confidence score can be based on a quantity of on-board sensors of a single vehicle that detected the object, for example, whether the object was detected by one or more of a lidar sensor, a radar sensor, a camera sensor, and so on. In some implementations, all on-board sensors of a vehicle will detect the same object, so there may be little variation in the detections confidence score based on detections by multiple sensors of a single vehicle. Second, the detection confidence score can be based on a quantity of vehicles that detected the object, for example, whether the object was detected by one vehicle, two vehicles, three vehicles, and so on. In some implementations, the quantity of nearby vehicles that detect various objects within an environment varies significantly based on environmental factors such as road congestion or inclement weather, so there may be a lot of variation in the detections confidence score based on multiple detections by multiple vehicles. Third, the detections confidence score can be based on a combination of the first and second options just described, for example, based on a quantity of sensors that detect an object across a plurality of vehicles. These and other options may be suitable in different environments or under different conditions, for example, urban versus rural environments, amount of available network bandwidth, whether vehicles transmit data for individual sensors or data that has already been combined across a vehicle's sensors to the data-processing center 4400, and so on.

As explained earlier, the real-time traffic analysis unit 4440 can determine whether a collision hazard exists by determining whether a first vehicle, e.g., the first connected vehicle 4010, is on a collision course with another vehicle or object, e.g., the object 4320a, and whether a difference between the velocity of the first vehicle and the velocity of the other vehicle or object is greater than a threshold velocity. If the real-time traffic analysis unit 4440 determines that a collision hazard exists, the data-processing center 4400 can transmit an alert 4450 to the first vehicle, and potentially to the other vehicle if that other vehicle is a connected vehicle capable of receiving alerts from the data-processing center 4400. The alert 4450 may be transmitted via a network connection 4460, which may be a wired or wireless electronic communication medium 1500 of FIG.

1, that may be accessed via the electronic communication interface 1370 of FIG. 1. In some implementations, the data-processing center 4400 may take into consideration the detections confidence score of the other vehicle or object when determining whether to send the alert 4450 or what information to include in the alert 4450. For example, a high detections confidence score indicates that the other vehicle or object has been detected by the on-board sensors of many vehicles, and therefore the accuracy of the absolute location (and velocity) of the other vehicle or object is high. Thus, the alert 4450 is less likely to be a false positive, and further, the information included in the alert 4450 may be more specific or include more details than if the detections confidence score were lower. For example, a more specific alert 4450 may indicate "traffic slows to 5 MPH in 100 feet," whereas a less specific alert 4450 may indicate "slow traffic ahead."

In some implementations, the estimation confidence score and the detections confidence score may each be expressed as a number between 0 (lowest confidence) and 1 (highest confidence). In some implementations, the estimation confidence score and the detections confidence score can be combined into a single confidence score. A suitable combining function may be utilized, for example, a simple arithmetic or geometric average, a weighted arithmetic or geometric average, and so on. In some implementations, the data-processing center 4400 may take into consideration the combined confidence score of the other vehicle or object when determining whether to send the alert 4450 what information to include in the alert 4450.

Figure 6:
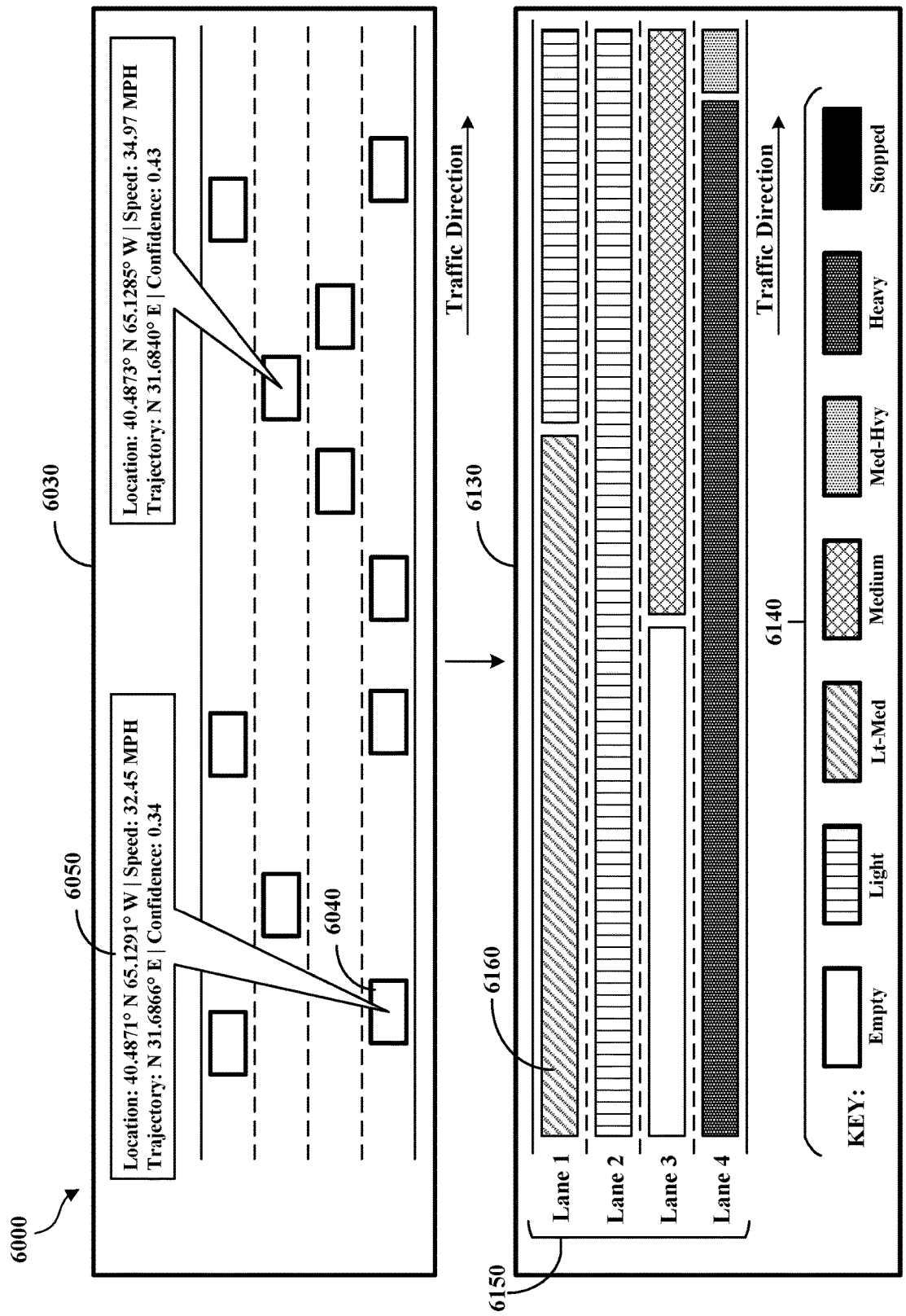
FIG. 6 is an example of generating a lane-level traffic model from a shared-world model.

FIG. 6 is an example of a system 6000 for generating a lane-level traffic model 6130 from a shared-world model 6030. The shared-world model 6030 may be the shared-world model 4430 of FIG. 4 or the shared-world model 4434 of FIG. 5. Generating the lane-level traffic model 6130 may be performed by the lane-level data fusion unit 4420 of FIGS. 4 and 5. The shared-world model 6030 indicates a plurality of objects 6040 (e.g., vehicles, stationary objects, pedestrians, and so on), each having one or more parameters 6050 associated therewith. At minimum, a location parameter, e.g., absolute location, is associated with each object 6040. Other parameters may be associated with one or more object 6040, including speed, trajectory (e.g., heading), velocity (e.g., speed and trajectory), confidence (e.g., one or more of an estimation confidence score, a detections confidence score, and a combined estimation and detections confidence score), and so on.

The lane-level traffic model 6130 can represent one or more lane-level traffic functions. For example, the lane-level traffic model 6130 can represent lane-level traffic density, lane-level traffic throughput (e.g., lane-level traffic flow), lane-level traffic speed, and so on. Lane-level traffic density describes a quantity of objects, e.g., vehicles, in each lane per unit distance, for example, 25 vehicles per mile, 0.016 vehicles per meter, and so on. Lane-level traffic throughput describes a quantity of objects, e.g., vehicles, that pass a given location per unit time, for example, 30 vehicles per minute. Lane-level traffic speed describes an average of the speed of each object, e.g., each vehicle, when it passes through a given location as measured over a predefined duration, or similarly, an average of the speed of each object, e.g., each vehicle, that is within a predefined distance (e.g., a predefined length of a road) at a given time. The lane-level traffic model 6130 of FIG. 6 depicts traffic density, where each lane of the plurality of lanes 6150 includes one or more elongated rectangles 6160 that describe the density of objects, e.g., vehicles, according to the type of filled appearance of each elongated rectangle 6160 (in some cases, the elongated rectangles 6160 may not be elongated). A key 6140 is provided near the bottom of the lane-level traffic model 6130 with labels describing each type of filled appearance, e.g., "empty," "light," and so on. The elongated rectangles 6160 may represent traffic density (or any other traffic function) by other graphical or textual means, for example, by various colors, by various transparencies, by various textual labels, and so on. Further, the elongated rectangles 6160 may be another suitable shape or drawing element, such as a simple line whose thickness (stroke), color, transparency, or other graphical parameters can be varied. The key 6140, or any textual labels of the elongated rectangles 6160, may be qualitative (as shown in FIG. 6), for example, "heavy" (for density), "slow" (for speed), "congested" (for throughput), and so on. Alternatively or additionally, the key 6140, or any textual labels of the elongated rectangles 6160, may be quantitative, for example, "100 ft average distance between vehicles" (for density), "45 MPH" (for speed), "0.5 vehicles per second" (for throughput), and so on. The lane-level traffic model 6130 may be presented to a user, e.g., a driver of a vehicle, via a graphical user interface, such as the user interface 1350 of FIG. 1 or a graphical display of a mobile device such as a smartphone. Although the lane-level traffic model 6130 is oriented horizontally in FIG. 6, other suitable and/or user-configurable orientations may be utilized.

For simplicity of explanation, each technique, or process, is depicted and described herein as a series of steps or operations. However, the steps or operations of the techniques in accordance with this disclosure can occur in various orders and/or concurrently. Additionally, other steps or operations not presented and described herein may be used. Furthermore, not all illustrated steps or operations may be required to implement a technique in accordance with the disclosed subject matter.

The techniques 8000 described below is a technique for determining a shared-world model. This technique may be implemented by a data-processing center, e.g., the data-processing center 4400 of FIG. 5, that receives data from a plurality of connected vehicles, e.g., the first connected vehicle 4010, the second connected vehicle 4110, and the third connected vehicle 4310.

Figure 8:
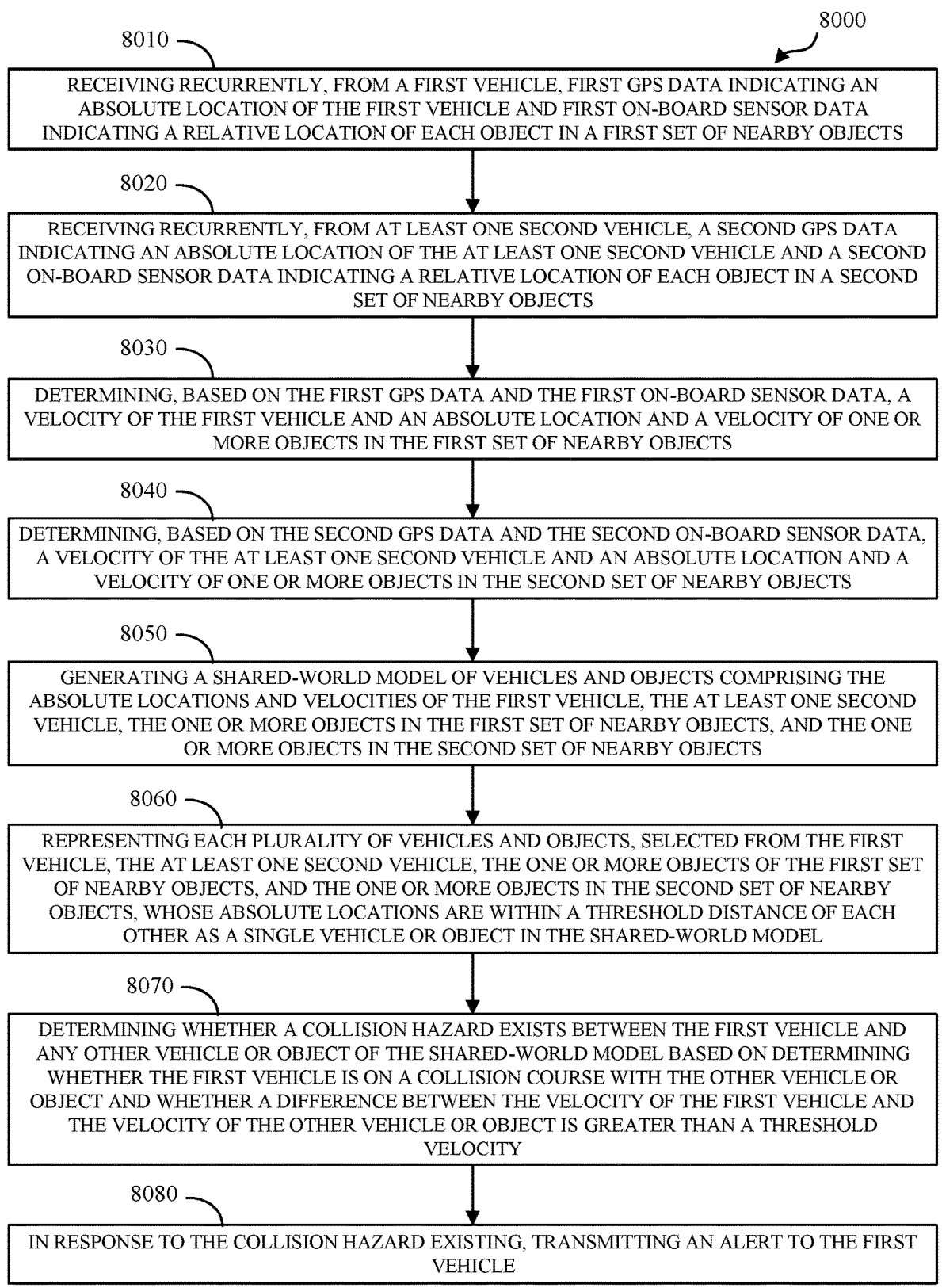
FIG. 8 is a flowchart of an example of a process for determining and analyzing a shared-world model and sending an alert to a vehicle represented in the shared-world model.

FIG. 8 is a flowchart of an example of a technique 8000 for sending an alert to a connected vehicle based on a determination and analysis of a shared-world model. The step 8010 comprises receiving recurrently, from a first vehicle, first GPS data indicating an absolute location of the first vehicle and first on-board sensor data indicating a relative location of each object in a first set of nearby objects. A data-processing center, e.g., the data-processing center 4400 of FIG. 5, may receive the first GPS data and the first on-board sensor data, and the data-processing center may receive such data from a network, e.g., the electronic communication network 2300 of FIG. 2. The first vehicle may be the first connected vehicle 4010 of FIG. 5, and each object of the first set of objects may correspond to the object 4020 of FIG. 5. The first on-board sensor data may be one or more of lidar data, camera data, radar data, or acoustic data.

The step 8020 comprises receiving recurrently, from at least one second vehicle, a second GPS data indicating an absolute location of the at least one second vehicle and a second on-board sensor data indicating a relative location of each object in a second set of nearby objects. A data-processing center, e.g., the data-processing center 4400 of FIG. 5, may receive the second GPS data and the second on-board sensor data, and the data-processing center may receive such data from a network, e.g., the electronic communication network 2300 of FIG. 2. The at least one second vehicle may be the third connected vehicle 4310 of FIG. 5, and each object of the second set of objects may correspond to the objects 4320a and 4320b of FIG. 5. The second on-board sensor data may be one or more of lidar data, camera data, radar data, or acoustic data.

The step 8030 comprises determining, based on the first GPS data and the first on-board sensor data, a velocity of the first vehicle and an absolute location and a velocity of one or more objects in the first set of nearby objects. A computing device, e.g., the lane-level data fusion unit 4420 of FIG. 5, may determine the absolute locations and the velocity.

The step 8040 comprises determining, based on the second GPS data and the second on-board sensor data, a velocity of the at least one second vehicle and an absolute location and a velocity of one or more objects in the second set of nearby objects. A computing device, e.g., the lane-level data fusion unit 4420 of FIG. 5, may determine the absolute locations and the velocity.

The step 8050 comprises generating a shared-world model of vehicles and objects comprising the absolute locations and velocities of the first vehicle, the at least one second vehicle, the one or more objects in the first set of nearby objects, and the one or more objects in the second set of nearby objects. The shared-world model may be the shared-world model 4434 of FIG. 5.

The step 8060 comprises representing each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model. Determining each plurality of vehicles and objects whose absolute locations are within a threshold distance of each other may be performed by a computing device, e.g., the lane-level data fusion unit 4420 of FIG. 5. The object 4320a is an example of representing a plurality of vehicles or objects as a single vehicle or object.

The step 8070 comprises, determining whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity. Determining whether a collision hazard exists may be performed by a computing device, e.g., the real-time traffic analysis unit 4440 of FIG. 5.

The step 8080 comprises, in response to the collision hazard existing, transmitting an alert to the first vehicle. Such transmission may utilize a network, e.g., the electronic communication network 2300 of FIG. 2. The alert 4450 of FIG. 5 sent via the network connection 4460, is an example of transmitting an alert.

The above-described techniques can be implemented as a method, a system, and a non-transitory computer-readable medium.

In an example implementation as a method, the method includes: receiving recurrently, from a first vehicle, first GPS data indicating an absolute location of the first vehicle and first on-board sensor data indicating a relative location of each object in a first set of nearby objects; receiving recurrently, from at least one second vehicle, a second GPS data indicating an absolute location of the at least one second vehicle and a second on-board sensor data indicating a relative location of each object in a second set of nearby objects; determining, based on the first GPS data and the first on-board sensor data, a velocity of the first vehicle and an absolute location and a velocity of one or more objects in the first set of nearby objects; determining, based on the second GPS data and the second on-board sensor data, a velocity of the at least one second vehicle and an absolute location and a velocity of one or more objects in the second set of nearby objects; generating a shared-world model of vehicles and objects comprising the absolute locations and velocities of the first vehicle, the at least one second vehicle, the one or more objects in the first set of nearby objects, and the one or more objects in the second set of nearby objects; representing each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model; determining whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and in response to the collision hazard existing, transmitting an alert to the first vehicle.

In some implementations, the first on-board sensor data and the second on-board sensor data each comprise at least one of: lidar data; camera data; radar data; or acoustic data.

In some implementations, the alert causes the first vehicle to produce a human-comprehendible message comprising at least one of: a visual message presented via a graphical interface of an infotainment system, a head-up display, or a mobile device; or an audio message presented via a speaker of an infotainment system or a mobile device.

In some implementations, the first vehicle is an autonomous vehicle and the alert causes the first vehicle to implement an action comprising at least one of: modifying a speed of the first vehicle; or modifying a trajectory of the first vehicle.

In some implementations, the method further comprises: determining a first confidence score for at least one object of the shared-world model based on a quantity of vehicles and objects that are represented by the at least one object; wherein the transmitting of the alert is in further response to the first confidence score exceeding a first threshold value.

In some implementations, the method further comprises: determining an estimated absolute location and an estimated velocity for at least one object of the shared-world model that represents an object in the first set of nearby objects or an object in the second set of nearby objects for which no indication of a relative location has been received for at least a threshold duration.

In some implementations, the method further comprises: determining a second confidence score for at least one object of the shared-world model based on a time elapsed since receiving an indication of a relative location of the at least one object; wherein the transmitting of the alert is in further response to the second confidence score exceeding a second threshold value.

In another example implementation as a system, the system comprises one or more memories; and one or more processors configured to execute instructions stored in the one or more memories to: receive recurrently, from a first vehicle, first GPS data indicating an absolute location of the first vehicle and first on-board sensor data indicating a relative location of each object in a first set of nearby objects; receive recurrently, from at least one second vehicle, a second GPS data indicating an absolute location of the at least one second vehicle and a second on-board sensor data indicating a relative location of each object in a second set of nearby objects; determine, based on the first GPS data and the first on-board sensor data, a velocity of the first vehicle and an absolute location and a velocity of one or more objects in the first set of nearby objects; determine, based on the second GPS data and the second on-board sensor data, a velocity of the at least one second vehicle and an absolute location and a velocity of one or more objects in the second set of nearby objects; generate a shared-world model of vehicles and objects comprising the absolute locations and velocities of the first vehicle, the at least one second vehicle, the one or more objects in the first set of nearby objects, and the one or more objects in the second set of nearby objects; represent each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model; determine whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and in response to the collision hazard existing, transmit an alert to the first vehicle.

In some implementations, the first on-board sensor data and the second on-board sensor data each comprise at least one of: lidar data; camera data; radar data; or acoustic data.

In some implementations, the alert causes the first vehicle to produce a human-comprehendible message comprising at least one of: a visual message presented via a graphical interface of an infotainment system, a head-up display, or a mobile device; or an audio message presented via a speaker of an infotainment system or a mobile device.

In some implementations, the first vehicle is an autonomous vehicle and the alert causes the first vehicle to implement an action comprising at least one of: modifying a speed of the first vehicle; or modifying a trajectory of the first vehicle.

In some implementations, the instructions include instructions to: determine a first confidence score for at least one object of the shared-world model based on a quantity of vehicles and objects that are represented by the at least one object; wherein the transmission of the alert is in further response to the first confidence score exceeding a first threshold value.

In some implementations, the instructions include instructions to: determine an estimated absolute location and an estimated velocity for at least one object of the shared-world model that represents an object in the first set of nearby objects or an object in the second set of nearby objects for which no indication of a relative location has been received for at least a threshold duration.

In some implementations, the instructions include instructions to: determine a second confidence score for at least one object of the shared-world model based on a time elapsed since receiving an indication of a relative location of the at least one object; wherein the transmission of the alert is in further response to the second confidence score exceeding a second threshold value.

In another example implementation as a non-transitory computer-readable medium, the non-transitory computer-readable medium stores instructions operable to cause one or more processors to perform operations comprising: receiving recurrently, from a first vehicle, first GPS data indicating an absolute location of the first vehicle and first on-board sensor data indicating a relative location of each object in a first set of nearby objects; receiving recurrently, from at least one second vehicle, a second GPS data indicating an absolute location of the at least one second vehicle and a second on-board sensor data indicating a relative location of each object in a second set of nearby objects; determining, based on the first GPS data and the first on-board sensor data, a velocity of the first vehicle and an absolute location and a velocity of one or more objects in the first set of nearby objects; determining, based on the second GPS data and the second on-board sensor data, a velocity of the at least one second vehicle and an absolute location and a velocity of one or more objects in the second set of nearby objects; generating a shared-world model of vehicles and objects comprising the absolute locations and velocities of the first vehicle, the at least one second vehicle, the one or more objects in the first set of nearby objects, and the one or more objects in the second set of nearby objects; representing each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model; determining whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and in response to the collision hazard existing, transmitting an alert to the first vehicle.

In some implementations, the first on-board sensor data and the second on-board sensor data each comprise at least one of: lidar data; camera data; radar data; or acoustic data.

In some implementations, the alert causes the first vehicle to produce a human-comprehendible message comprising at least one of: a visual message presented via a graphical interface of an infotainment system, a head-up display, or a mobile device; or an audio message presented via a speaker of an infotainment system or a mobile device.

In some implementations, the first vehicle is an autonomous vehicle and the alert causes the first vehicle to implement an action comprising at least one of: modifying a speed of the first vehicle; or modifying a trajectory of the first vehicle.

In some implementations, the operations further comprise: determining a first confidence score for at least one object of the shared-world model based on a quantity of vehicles and objects that are represented by the at least one object; wherein the transmitting of the alert is in further response to the first confidence score exceeding a first threshold value.

In some implementations, the operations further comprise: determining an estimated absolute location and an estimated velocity for at least one object of the shared-world model that represents an object in the first set of nearby objects or an object in the second set of nearby objects for which no indication of a relative location has been received for at least a threshold duration.

In some implementations, the operations further comprise: determining a second confidence score for at least one object of the shared-world model based on a time elapsed since receiving an indication of a relative location of the at least one object; wherein the transmitting of the alert is in further response to the second confidence score exceeding a second threshold value.

As used herein, the terminology "example," "embodiment," "implementation," "aspect," "feature," or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify," or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described to allow easy understanding of the disclosure are not limiting. On the contrary, the disclosure covers various modifications and equivalent arrangements included within the scope of the appended claims, which scope is to be accorded the broadest interpretation to encompass all such modifications and equivalent structure as is permitted under the law.

What is claimed is:

1. A method, comprising:
   receiving recurrently, from a first vehicle, first GPS data indicating an absolute location of the first vehicle and first on-board sensor data indicating a relative location of each object in a first set of nearby objects;
   receiving recurrently, from at least one second vehicle, a second GPS data indicating an absolute location of the at least one second vehicle and a second on-board sensor data indicating a relative location of each object in a second set of nearby objects;
   determining, based on the first GPS data and the first on-board sensor data, a velocity of the first vehicle and an absolute location and a velocity of one or more objects in the first set of nearby objects;
   determining, based on the second GPS data and the second on-board sensor data, a velocity of the at least one second vehicle and an absolute location and a velocity of one or more objects in the second set of nearby objects;
   generating a shared-world model of vehicles and objects comprising the absolute locations and velocities of the first vehicle, the at least one second vehicle, the one or more objects in the first set of nearby objects, and the one or more objects in the second set of nearby objects;
   representing each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model;
   determining whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and
   in response to the collision hazard existing, transmitting an alert to the first vehicle.

2. The method of claim 1, wherein the first on-board sensor data and the second on-board sensor data each comprise at least one of:
   lidar data;
   camera data;
   radar data; or
   acoustic data.

3. The method of claim 1, wherein the alert causes the first vehicle to produce a human-comprehendible message comprising at least one of:
   a visual message presented via a graphical interface of an infotainment system, a head-up display, or a mobile device; or
   an audio message presented via a speaker of an infotainment system or a mobile device.

4. The method of claim 1, wherein the first vehicle is an autonomous vehicle and the alert causes the first vehicle to implement an action comprising at least one of:
   modifying a speed of the first vehicle; or
   modifying a trajectory of the first vehicle.

5. The method of claim 1, further comprising:
   determining a first confidence score for at least one object of the shared-world model based on a quantity of vehicles and objects that are represented by the at least one object;
   wherein the transmitting of the alert is in further response to the first confidence score exceeding a first threshold value.

6. The method of claim 1, further comprising:
   determining an estimated absolute location and an estimated velocity for at least one object of the shared-world model that represents an object in the first set of nearby objects or an object in the second set of nearby objects for which no indication of a relative location has been received for at least a threshold duration.

7. The method of claim 1, further comprising:
   determining a second confidence score for at least one object of the shared-world model based on a time elapsed since receiving an indication of a relative location of the at least one object; wherein the transmitting of the alert is in further response to the second confidence score exceeding a second threshold value.

8. A system, comprising:

one or more memories; and one or more processors configured to execute instructions stored in the one or more memories to:

receive recurrently, from a first vehicle, first GPS data indicating an absolute location of the first vehicle and first on-board sensor data indicating a relative location of each object in a first set of nearby objects;

receive recurrently, from at least one second vehicle, a second GPS data indicating an absolute location of the at least one second vehicle and a second on-board sensor data indicating a relative location of each object in a second set of nearby objects;

determine, based on the first GPS data and the first on-board sensor data, a velocity of the first vehicle and an absolute location and a velocity of one or more objects in the first set of nearby objects;

determine, based on the second GPS data and the second on-board sensor data, a velocity of the at least one second vehicle and an absolute location and a velocity of one or more objects in the second set of nearby objects;

generate a shared-world model of vehicles and objects comprising the absolute locations and velocities of the first vehicle, the at least one second vehicle, the one or more objects in the first set of nearby objects, and the one or more objects in the second set of nearby objects;

represent each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model;

determine whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and in response to the collision hazard existing, transmit an alert to the first vehicle.

9. The system of claim 8, wherein the first on-board sensor data and the second on-board sensor data each comprise at least one of:

lidar data;
camera data;
radar data; or
acoustic data.

10. The system of claim 8, wherein the alert causes the first vehicle to produce a human-comprehendible message comprising at least one of:

a visual message presented via a graphical interface of an infotainment system, a head-up display, or a mobile device; or an audio message presented via a speaker of an infotainment system or a mobile device.

11. The system of claim 8, wherein the first vehicle is an autonomous vehicle and the alert causes the first vehicle to implement an action comprising at least one of:

modifying a speed of the first vehicle; or
modifying a trajectory of the first vehicle.

12. The system of claim 8, wherein the instructions include instructions to:

determine a first confidence score for at least one object of the shared-world model based on a quantity of vehicles and objects that are represented by the at least one object; wherein transmission of the alert is in further response to the first confidence score exceeding a first threshold value.

13. The system of claim 8, wherein the instructions include instructions to:

determine an estimated absolute location and an estimated velocity for at least one object of the shared-world model that represents an object in the first set of nearby objects or an object in the second set of nearby objects for which no indication of a relative location has been received for at least a threshold duration.

14. The system of claim 8, wherein the instructions include instructions to:

determine a second confidence score for at least one object of the shared-world model based on a time elapsed since receiving an indication of a relative location of the at least one object; wherein transmission of the alert is in further response to the second confidence score exceeding a second threshold value.

15. A non-transitory computer-readable medium storing instructions operable to cause one or more processors to perform operations comprising:

receiving recurrently, from a first vehicle, first GPS data indicating an absolute location of the first vehicle and first on-board sensor data indicating a relative location of each object in a first set of nearby objects;

receiving recurrently, from at least one second vehicle, a second GPS data indicating an absolute location of the at least one second vehicle and a second on-board sensor data indicating a relative location of each object in a second set of nearby objects;

determining, based on the first GPS data and the first on-board sensor data, a velocity of the first vehicle and an absolute location and a velocity of one or more objects in the first set of nearby objects;

determining, based on the second GPS data and the second on-board sensor data, a velocity of the at least one second vehicle and an absolute location and a velocity of one or more objects in the second set of nearby objects;

generating a shared-world model of vehicles and objects comprising the absolute locations and velocities of the first vehicle, the at least one second vehicle, the one or more objects in the first set of nearby objects, and the one or more objects in the second set of nearby objects;

representing each plurality of vehicles and objects, selected from the first vehicle, the at least one second vehicle, the one or more objects of the first set of nearby objects, and the one or more objects in the second set of nearby objects, whose absolute locations are within a threshold distance of each other as a single vehicle or object in the shared-world model;

determining whether a collision hazard exists between the first vehicle and any other vehicle or object of the shared-world model based on determining whether the first vehicle is on a collision course with the other vehicle or object and whether a difference between the velocity of the first vehicle and the velocity of the other vehicle or object is greater than a threshold velocity; and in response to the collision hazard existing, transmitting an alert to the first vehicle.

16. The medium of claim 15, wherein the first on-board sensor data and the second on-board sensor data each comprise at least one of:
   lidar data;
   camera data;
   radar data; or
   acoustic data.

17. The medium of claim 15, wherein the alert causes the first vehicle to produce a human-comprehendible message comprising at least one of:
   a visual message presented via a graphical interface of an infotainment system, a head-up display, or a mobile device; or
   an audio message presented via a speaker of the infotainment system or a mobile device.

18. The medium of claim 15, wherein the first vehicle is an autonomous vehicle and the alert causes the first vehicle to implement an action comprising at least one of:
   modifying a speed of the first vehicle; or
   modifying a trajectory of the first vehicle.

19. The medium of claim 15, the operations further comprising:
   determining a first confidence score for at least one object of the shared-world model based on a quantity of vehicles and objects that are represented by the at least one object;
   wherein the transmitting of the alert is in further response to the first confidence score exceeding a first threshold value.

20. The medium of claim 15, the operations further comprising:
   determining an estimated absolute location and an estimated velocity for at least one object of the shared-world model that represents an object in the first set of nearby objects or an object in the second set of nearby objects for which no indication of a relative location has been received for at least a threshold duration.

21. The medium of claim 15, the operations further comprising:
   determining a second confidence score for at least one object of the shared-world model based on a time elapsed since receiving an indication of a relative location of the at least one object; wherein
   the transmitting of the alert is in further response to the second confidence score exceeding a second threshold value.

* * * * *